(12) United States Patent
Taylor

(10) Patent No.: US 6,273,515 B1
(45) Date of Patent: Aug. 14, 2001

(54) ADJUSTABLE RIM ASSEMBLY

(75) Inventor: Fredrick B. Taylor, Rome, GA (US)

(73) Assignee: F. B. T. Enterprises, Inc., Rome, GA (US)

( * ) Notice: Subject to any disclaimer, the term of this patent is extended or adjusted under 35 U.S.C. 154(b) by 0 days.

(21) Appl. No.: 09/491,319

(22) Filed: Jan. 26, 2000

(51) Int. Cl.[7] .............................. B60B 23/02; B60B 25/04
(52) U.S. Cl. .......................... 301/9.2; 301/11.3; 301/14; 301/95
(58) Field of Search .......................... 301/9.1, 9.2, 10.1, 301/11.1, 11.3, 14, 35.51, 95, 24

(56) References Cited

U.S. PATENT DOCUMENTS

| | | | |
|---|---|---|---|
| 1,153,068 | * 9/1915 | Hale | 301/24 |
| 2,162,696 | * 6/1939 | Burger | 301/9.2 |
| 2,173,195 | * 9/1939 | Beckman | 301/9.2 |
| 2,291,156 | * 7/1942 | Heesch et al. | 310/9.2 |
| 2,294,256 | * 8/1942 | Uber | 301/9.2 |
| 2,486,970 | * 11/1949 | Nordenson | 301/9.2 |
| 2,580,481 | * 1/1952 | Strehlow | 301/9.2 |
| 2,840,418 | * 6/1958 | Findley et al. | 301/9.2 |
| 4,515,411 | * 5/1985 | Taylor | 301/9.2 |

* cited by examiner

*Primary Examiner*—S. Joseph Morano
*Assistant Examiner*—Jason R. Bellinger
(74) *Attorney, Agent, or Firm*—Thomas, Kayden, Horstemeyer & Risley, LLP

(57) ABSTRACT

An adjustable rim assembly 10 is provided for the wheel of a tractor or other industrial vehicle for changing the spacing of the opposed wheels of the vehicle. The mounting rail 20 is rigidly connected to the inwardly facing surface 22 of the rim base 12. Mounting rail 20 is formed in an accordion-like shape which forms a series of alternately axially spaced fore and aft planar mounting panels 24, 26, and mounting clamps 40 connect between the surfaces of the mounting panels and the opposed faces of the wheel disc 54. Various spacing of the wheel rim is achieved by changing the faces of the mounting panels 24, 26 to which the mounting clamps are connected.

10 Claims, 8 Drawing Sheets

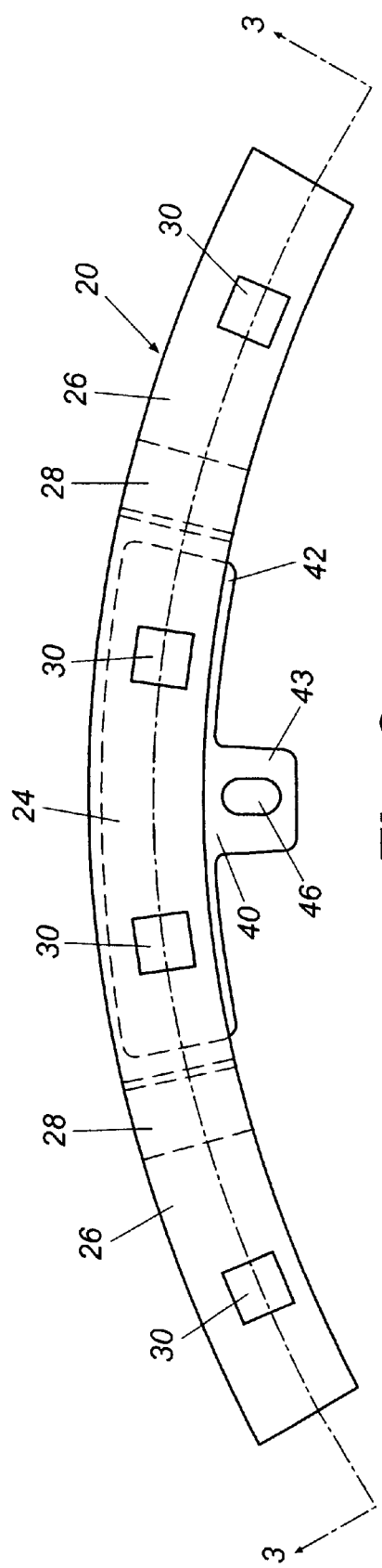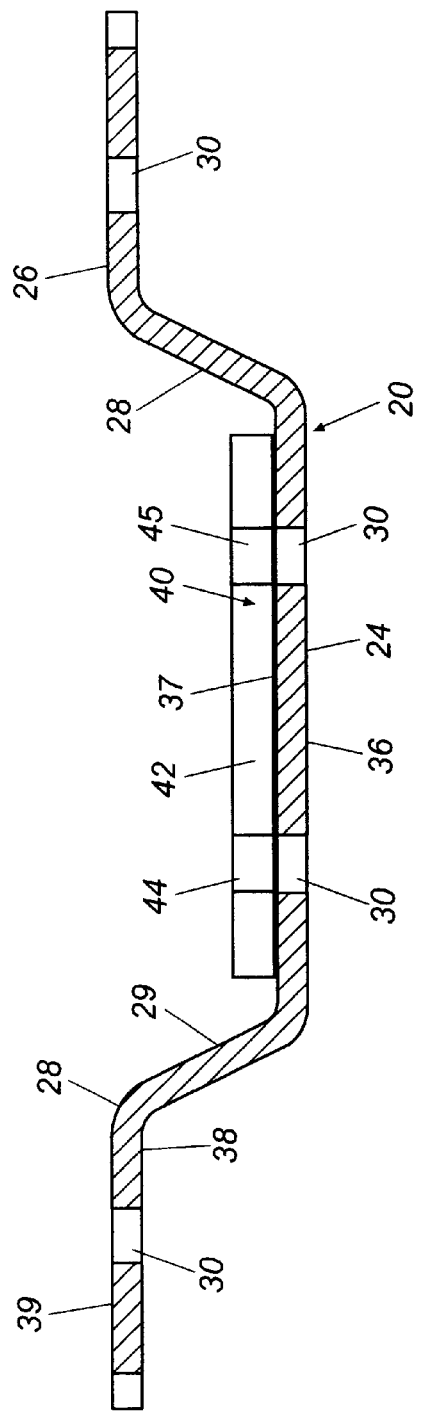

ADJUSTABLE RIM ASSEMBLY

FIELD OF THE INVENTION

This invention relates to wheels for farm tractors and other farm and industrial vehicles. More particularly, the invention relates to an adjustable rim assembly for varying the distances between the wheels of a farm tractor and the like.

BACKGROUND OF THE INVENTION

Some industrial vehicles, such as tractors and towed implements used on farms and operated down the rows of cultivated crops require some adjustability in the lateral spacing of the wheels from each other, both front wheels and rear wheels. For example, the ideal lateral spacing of some row crops is different from the spacing of other row crops, since some crops can be planted closer together to maximize the yield in a given area of land. Therefore, it is desirable that the vehicles operated along the rows of cultivated crops have the ability to increase or decrease the lateral distances between the wheels of the vehicles.

One of the common ways of changing the lateral spacing of wheels of a vehicle is to construct the discs of the wheels in a dish-shape, having opposed concave and convex surfaces, so that the hub portion of the wheel disc is axially offset to one side of the center line of the wheel. Therefore, a pair of wheels for the vehicle can be mounted with their convex sides attached to the wheel hub to space the tires further apart, or the wheels can be reversed to mount their concave sides to the wheel hub, placing the tires closer together.

While the above-described wheel spacing adjustability is common in the art, other means are required for providing more versatility in wheel spacing of vehicles. Various spacers have been developed over the years for placement between the wheel rim and the tractor hub to refine wheel displacement for the vehicle, but the prior art adjustment elements for wheels is, generally, cumbersome and in some cases not as safe as a standard wheel mount. Also, while various adjustable rim assemblies have been provided for mounting a wheel rim to the outwardly facing surface of the hub of a wheel assembly, it would also be desirable to be able to mount the wheel rim to the inner facing surface of the hub so as to further displace the tire inwardly with respect to the vehicle. While this is physically possible, the prior art does not provide an adjustable wheel rim structure that can be expediently and safely mounted to the interior surface of a wheel hub without sacrificing strength of the connection.

Thus, it is to these ends that this invention is directed.

SUMMARY OF THE INVENTION

Briefly described, the present invention comprises an adjustable rim assembly of a wheel of an industrial vehicle for changing the lateral spacing of the wheel from the vehicle and from the opposed wheel. The rim assembly includes a cylindrical rim base having a central axis of rotation, and a concentric mounting ring or rail rigidly connected about and extending inwardly from the cylindrical rim base. The mounting rail is formed with a series of axially inner and axially outer planar mounting panels, each extending normal to the axis of rotation and alternate ones axially offset from adjacent ones of the mounting panels about the rim base. Intermediate axially extending support panels are joined to the mounting panels. The axially inner mounting panels are positioned in the first common plane and the axially outer mounting panels are positioned in a second common plane. Both the axially inner and axially outer mounting panels define opposed axially inner and axially outer mounting surfaces which extend normal to the axis of rotation of the rim base, and connector openings are formed through the axially inner and axially outer mounting panels.

Mounting clamps are positioned in a common plane against either the axially inner or axially outer mounting faces of alternate ones of the mounting panels. The mounting clamps define openings which are sized, shaped and adapted to align with the connector openings of these planar mounting panels of the mounting rail. The mounting clamps extend radially inwardly of the mounting rail and define openings which are alignable with the hub of the vehicle wheel. Bolts connect the mounting clamps to the vehicle hub and other bolts connect the mounting clamps to the mounting rail.

The mounting clamps can be mounted to various surfaces formed by the mounting rail so as to axially displace the tire carried by the rim base, therefore varying the spacing of the tire from the vehicle. For example, the mounting clamps can be mounted to the axially inner surfaces of the axially inner planar mounting panels or to the axially inner surfaces of the axially outer planar mounting panels, to the axially outer surfaces of the axially inner planar mounting panels or to the axially outer surfaces of the axially outer planar mounting panels. All of these positions can be accomplished with the rim being mounted to the front or axially inner surface mounting surface of the hub. The same flexibility is available with mounting the rim to the rear or axially outer mounting surface of the wheel hub, thereby doubling the possible number of wheel spacings. Likewise, if the hub of the vehicle is reversed on its axle, the mounting rim of the hub is placed in an axially displaced location, and the above-described possible wheel spacings is again doubled. This provides sixteen different wheel spacings for a single wheel and rim assembly.

BRIEF DESCRIPTION OF THE DRAWINGS

FIG. 2 is a side view of a portion of the mounting rail.

FIG. 3 is a top cross sectional view of the portion of the mounting rail shown in FIG. 2.

DETAILED DESCRIPTION

Figure 1:
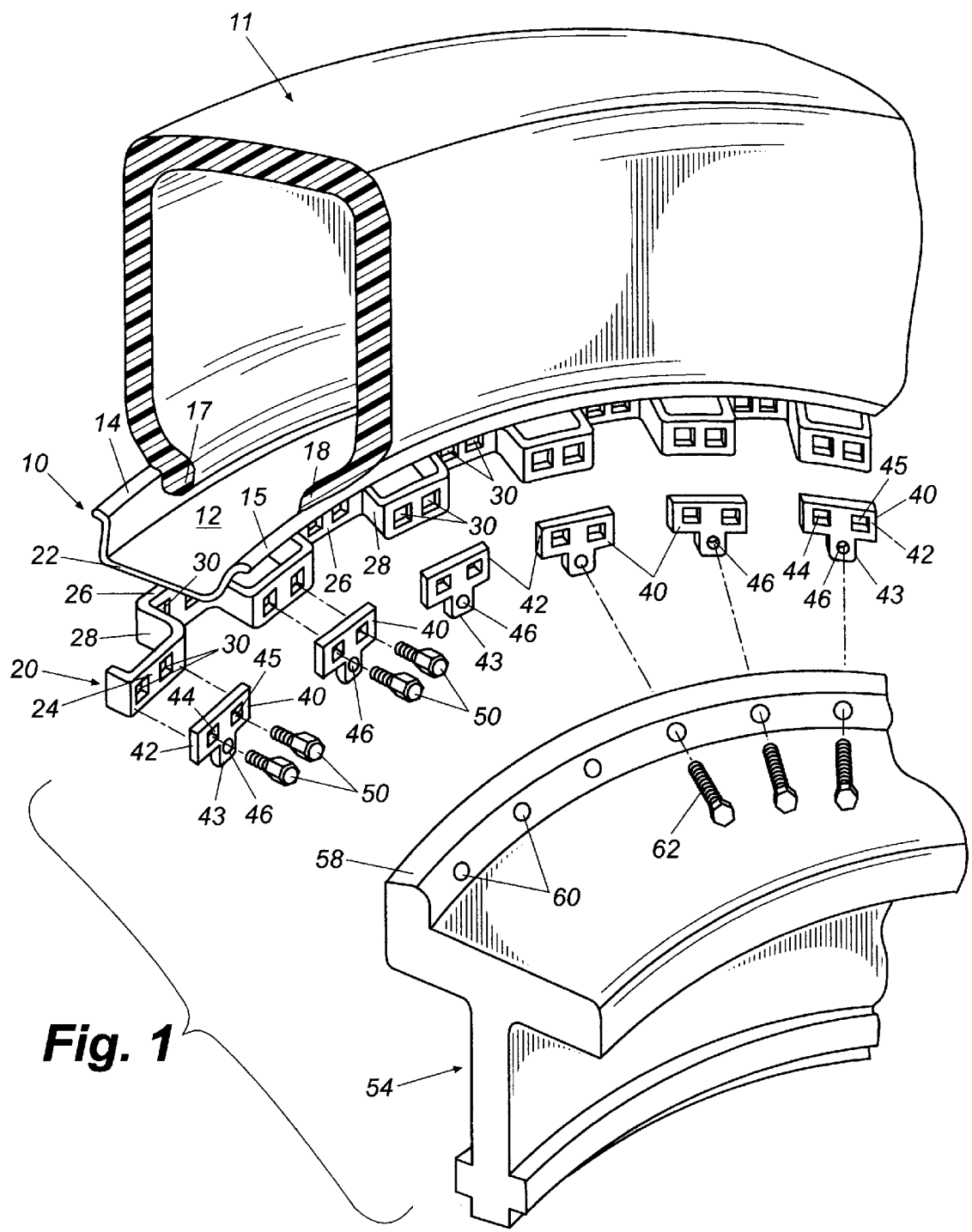
FIG. 1 is an expanded, perspective partial illustration of the wheel rim assembly, showing the tire mounted to the rim base and the rim base, mounting rail, mounting clamps, and the hub of the wheel.

Referring now in more detail to the drawings, in which like numerals indicate like parts throughout the several views, FIG. 1 illustrates a wheel rim 10 onto which a vehicle tire 11 is mounted. The wheel rim 10 is illustrated as being a one piece rim, but it will be understood by those skilled in the art that multiple piece rims, such as conventional three or five-piece rims can be employed. Wheel rim 10 includes a rim base 12 having opposed side flanges 14, 15 with the beads 17, 18 of the tire seated at the intersection of the side flanges and the rim base. Generally, the rim base 12 is cylindrical and has a central axis 21 (FIG. 5) which is the axis of rotation of the wheel when the wheel is in motion.

Mounting rail 20 is concentric with rim base 12, and is attached to the inwardly facing surface 22 of the rim base. In the embodiment illustrated, the mounting rail is formed of a continuous length or band of material that is formed in an accordion-like shape with alternate, axially inner and axially outer planar mounting panels 24, 26 which are oriented normal to the axis of rotation 21 of the wheel rim, and with support panels 28 extending between adjacent edges of the axially inner and axially outer planar mounting panels 24, 26. Connector openings 30 are formed in both the axially inner and axially outer planar mounting panels. The connector openings are square shaped so as to receive a bolt or other connector element that has a complimentary interfitting shape. The support panels 28 extend approximately axially of the wheel rim, substantially parallel to the axis of rotation 21 of the tire 11.

Figure 4:
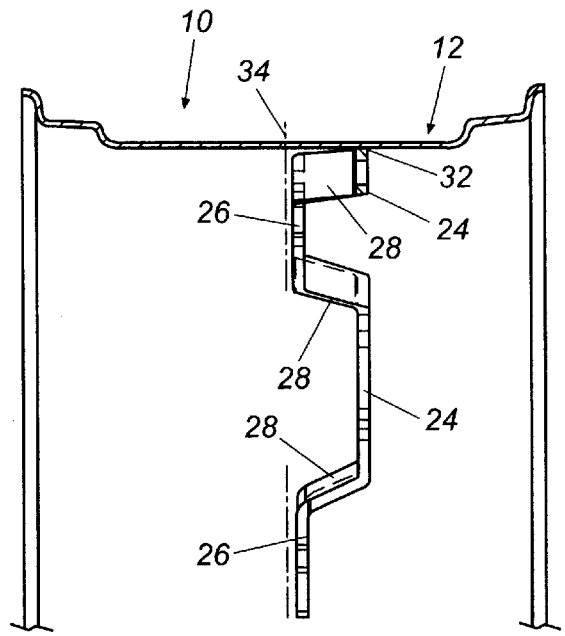
FIG. 4 is a cross sectional view of the rim base and mounting rail, showing how the mounting rail is attached to the rim base.
Figure 5:
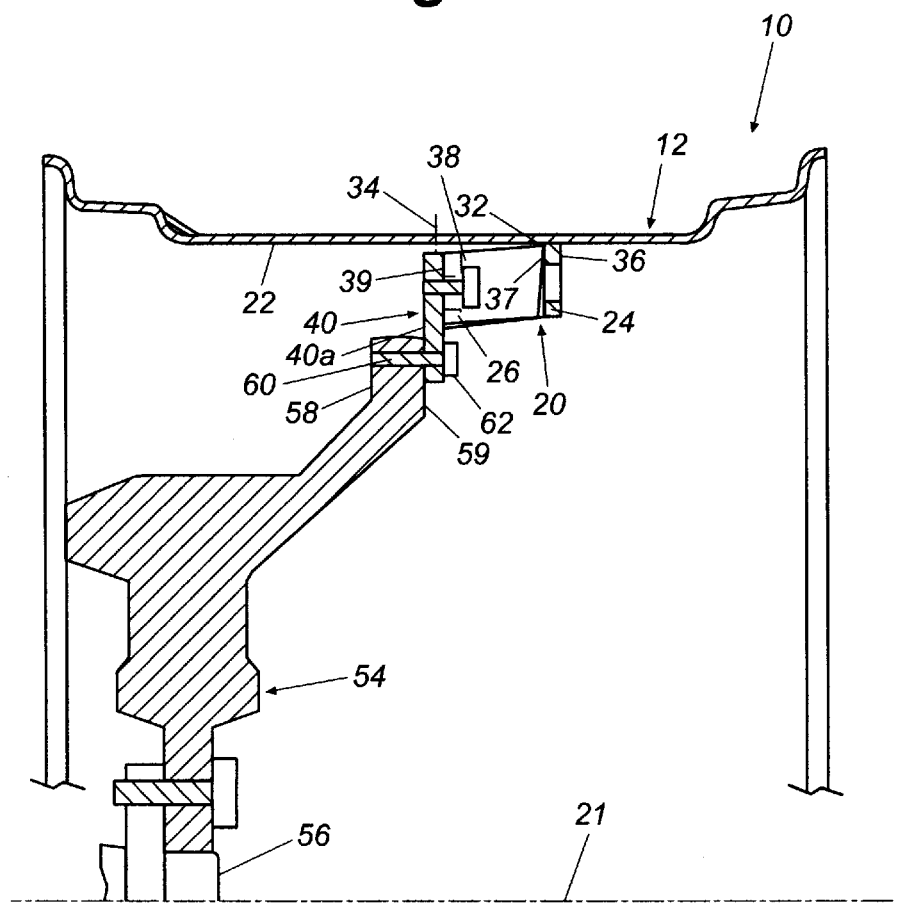
FIG. 5 is a cross sectional view of the rim base, a portion of the mounting rail, a mounting arm and a hub of a wheel of the vehicle, showing how these elements are attached to each other.

As shown in FIGS. 4 and 5, it will be noted that the axially inner mounting panels 24 of the mounting rail 20 are mounted by weldments 32 to the inwardly facing cylindrical surface 22 of the rim base 12, in a position so that the axially outer mounting panels 26 are located adjacent the center line 34 of the wheel rim 10. This displaces the axially inner mounting panels 24 axially forwardly from the wheel center line 34. Also, it can be seen in FIGS. 4 and 5 that the axially inner mounting panels 24 are of greater outside diameter than the axially outer mounting panels 26, so that the axially inner mounting panels are connected to the rim base 12 but the axially outer mounting panels do not engage the rim base. If the mounting rail is reversed, the larger diameter mounting panels become the axially outer mounting panels which would be connected to the rim base.

As illustrated in FIG. 5, the axially inner and axially outer mounting panels 24 and 26 each have a axially inner surface 36 and an axially outer surface 37, and each axially outer mounting panel 36 similarly has a axially inner surface 38 and an axially outer surface 39. The surfaces 36–39 are all substantially perpendicular to the axis of rotation 21 of the wheel rim.

Figure 6:
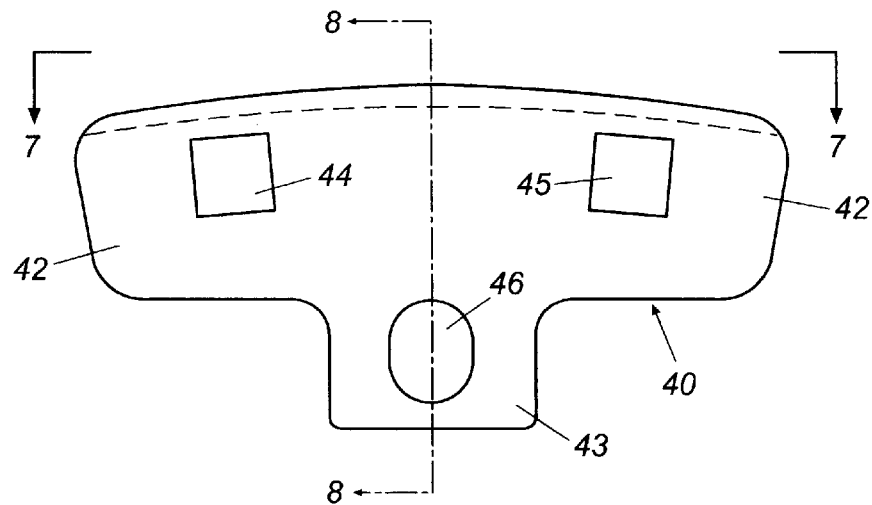
FIG. 6 is a front view of a mounting arm.
Figure 7:
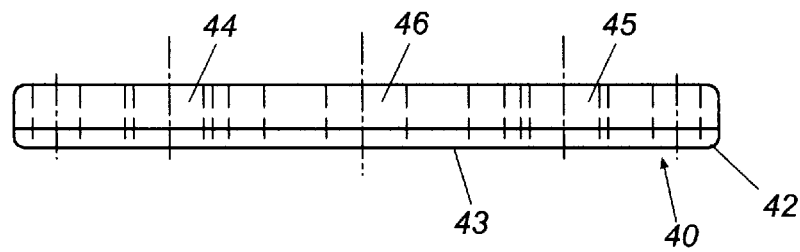
FIG. 7 is a cross sectional view of the mounting arm of FIG. 6, taken along line 7—7 of FIG. 6.
Figure 8:
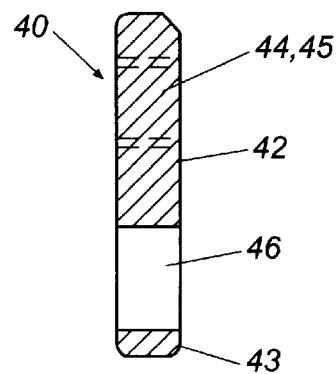
FIG. 8 is a side cross sectional view of the mounting arm of FIG. 6, taken along lines 8—8 of FIG. 6.

Mounting clamps or clamps 40 are positioned in abutment with either the axially inner mounting panels 24 or the axially outer mounting panels 26. As illustrated in FIGS. 6–8, the mounting clamps 40 are approximately T-shaped, in that they include a relatively wide clamp plate 42 and a relatively narrow clamp stem 43 positioned intermediate the ends of the clamp plate 42. A pair of square clamp plate openings 44, 45 are formed in the clamp plate 42, and an oval clamp stem opening 46 is formed through clamp stem 43, so that the openings 44, 45, 46 form a triangular relationship with one another.

The clamp plate openings 44, 45 are sized, shaped and spaced apart so as to align with the connector openings 30 of mounting rail 20 as shown in FIGS. 1–3. The mounting clamps 40 are placed in abutment either with the axially inner or axially outer surfaces 36 or 37 of the axially inner planar mounting panels, or with the axially inner or axially outer surfaces of the axially outer mounting panels, and connector bolts 50 of corresponding shape are inserted through the aligned connector openings 30 of the mounting rail and the clamp plate openings 44 or 45 of the mounting clamps to rigidly connect the mounting clamps to the mounting rail. This places the clamp stem 43 of the mounting clamps inwardly of the mounting rail 20, as illustrated in FIG. 2.

As illustrated in FIG. 3, it will be noted that the width of the clamp plate 42 is less than the length of either of the axially inner or axially outer mounting panels 24 and 26, so that the mounting clamps can be mounted to either side of the axially inner and axially outer mounting panels.

Figure 10A:
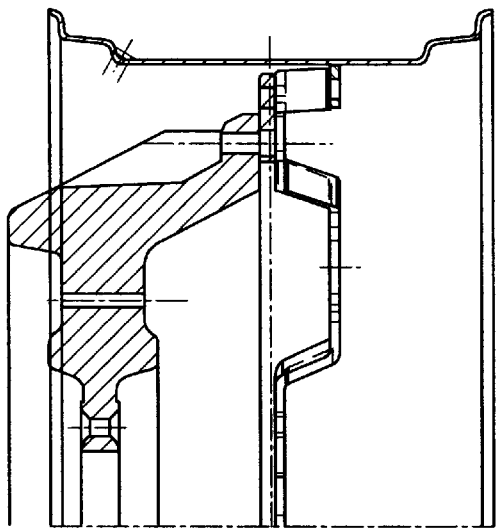
Figure 10B:
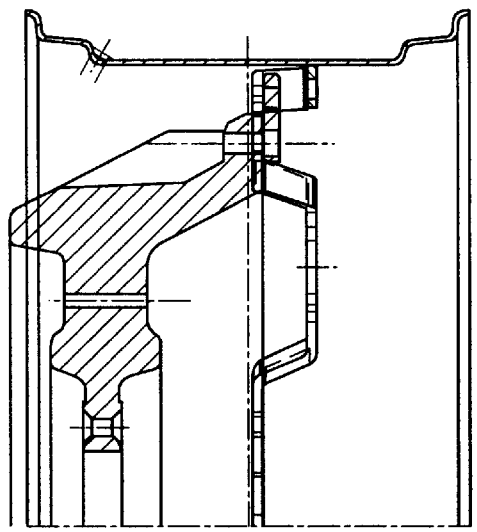
Figure 10C:
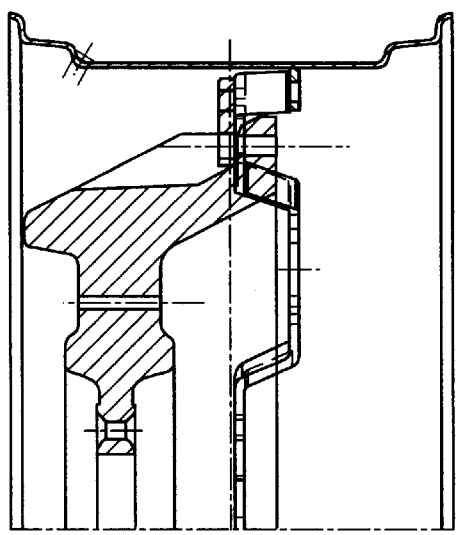
Figure 10D:
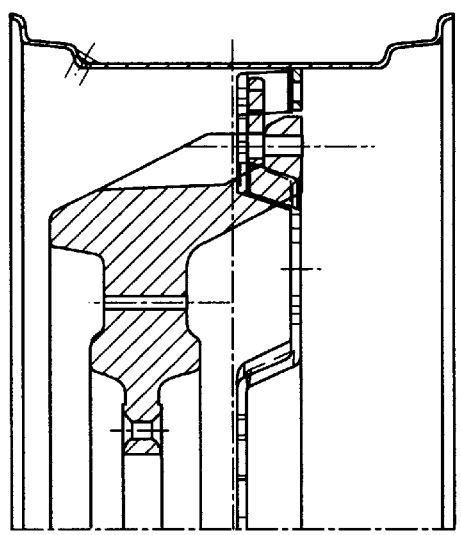
Figure 11A:
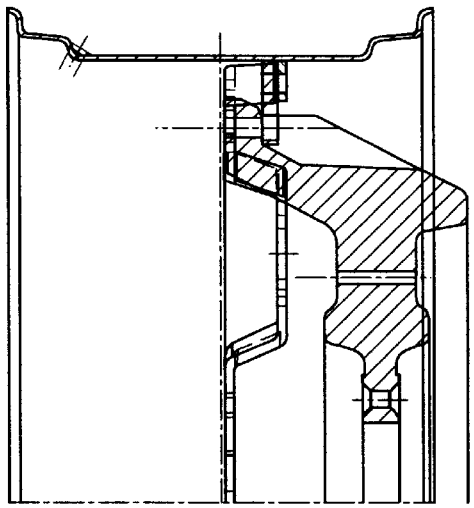
Figure 11B:
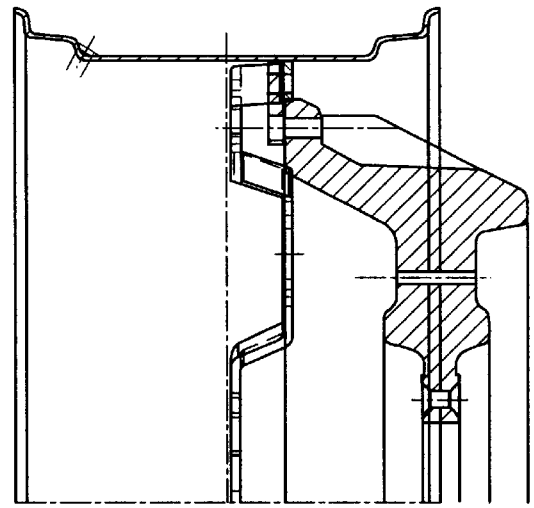
Figure 11C:
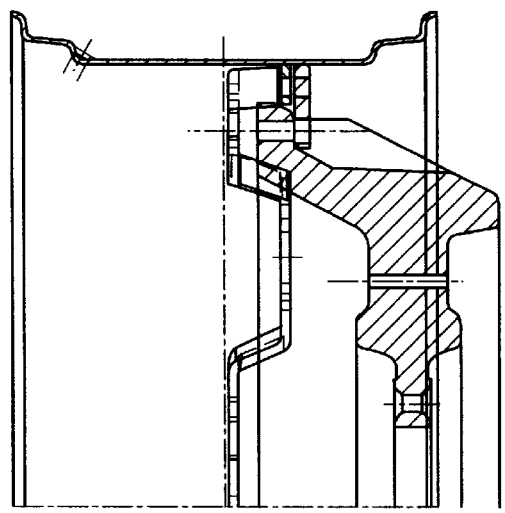
Figure 11D:
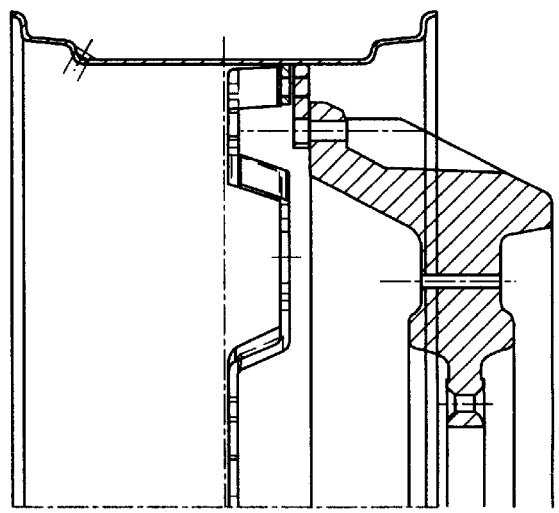
Figure 12A:
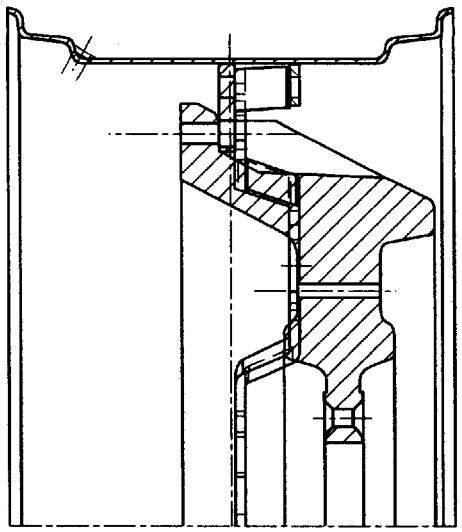
Figure 12B:
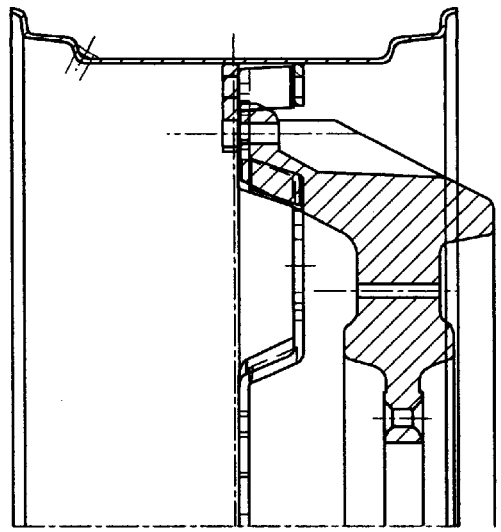
Figure 12C:
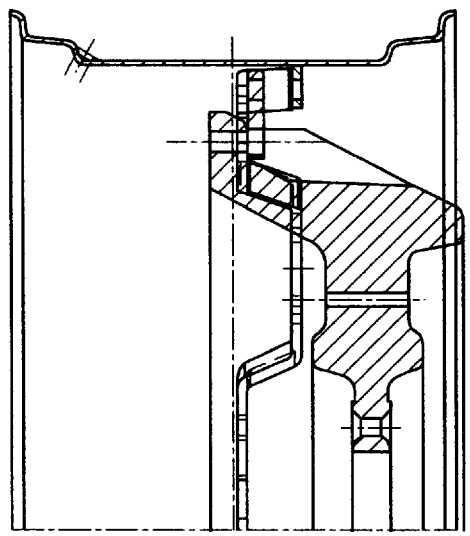
Figure 12D:
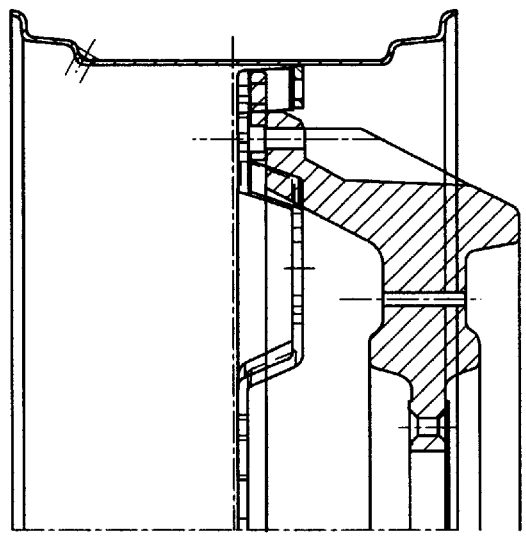

As illustrated in FIG. 5, one of the optional mounting arrangements of the wheel rim assembly 10 to the disc 54 of the wheel is to place the mounting clamps 40 in abutment with the axially outer surface 39 of the axially outer mounting panel 26 of the mounting rail 20, and then mount the axially outer surfaces 40a of the mounting clamps to the axially inner surfaces 59 of the annular perimeter flange 58 of the wheel disc 54. This places the wheel rim assembly 10 at its farthest outward position with respect to the vehicle. This is also illustrated in FIG. 10A.

Figure 9A:
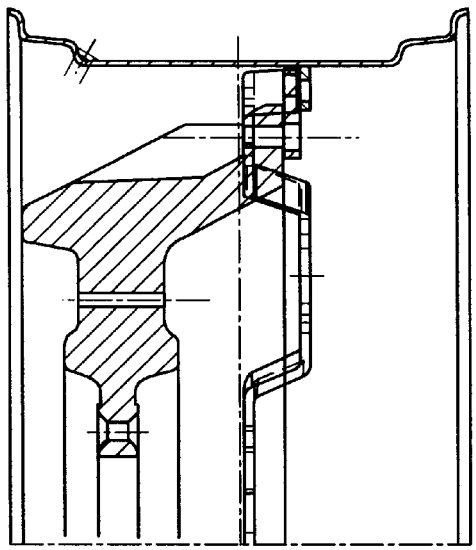
FIGS. 9A–9D, 10A–10D, 11A–11D and 12A–12D are cross sectional views of a wheel rim, mounting rail, mounting clamps and hub of a vehicle wheel, showing the multiple positions of the wheel rim with respect to the hub of the vehicle.
Figure 9B:
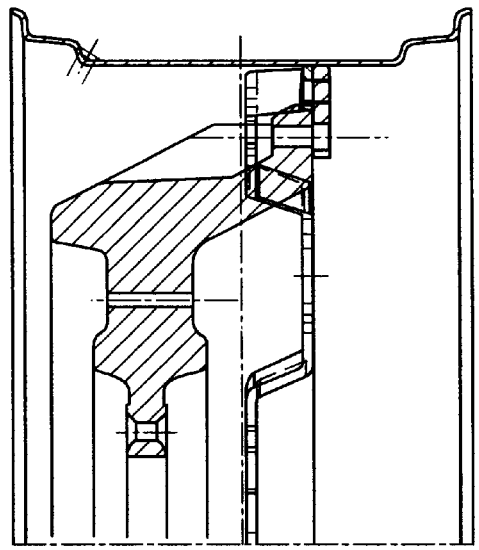
Figure 9C:
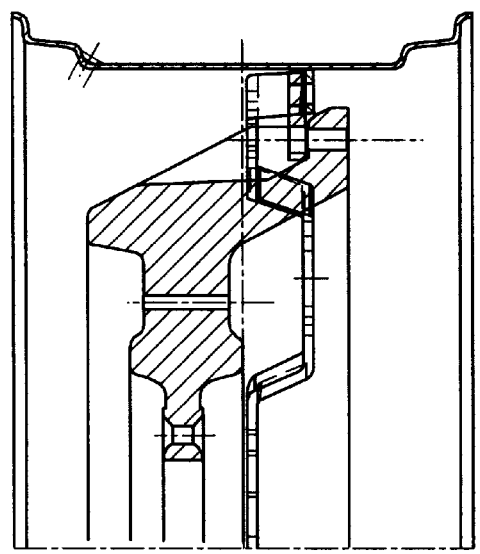
Figure 9D:
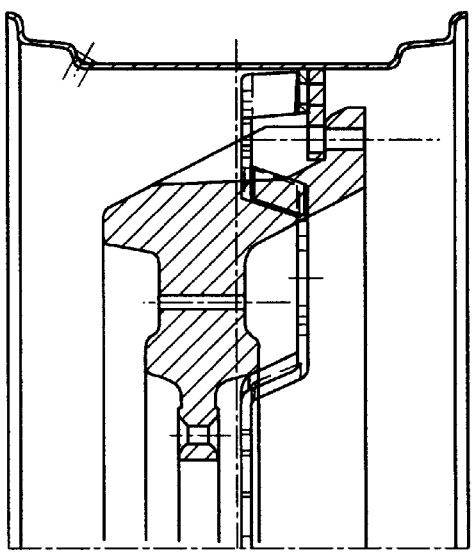

FIGS. 9A and 9B illustrate the positions of the wheel rim 10 when the mounting clamps 40 are positioned on alternate, axially inner or axially outer surfaces 36 or 37 of the axially inner mounting panels 24. FIGS. 9C and 9D illustrate similar alternate positions of the mounting clamps 40 with respect to the axially inner mounting panels 24 of the mounting rail, but with the mounting clamps alternately connected to the axially inner or axially outer surfaces of the annular perimeter flange 58 of the wheel disc 54.

FIGS. 10A–10D correspond to FIGS. 9A–9D, but with the mounting clamps 40 mounted to the aft mounting panels 26.

FIGS. 11A–11D correspond to FIGS. 9A–9D, but with the wheel disc reversed.

FIGS. 12A–12D correspond to FIGS. 10A–10D, but with the wheel disc reversed. Therefore, it can be seen that there are 16 different wheel rim connections that can be achieved with respect to the hub 56 of the vehicle.

As will be noted from FIG. 5, the mounting rail 20 has a larger inside diameter than the annular perimeter flange 58 of the wheel hub 56. Only the clamp stems 43 (FIG. 2) protrude radially inwardly of the clamp rail 20. This permits the wheel rim assembly to be tilted or turned with respect to the wheel hub 56 so as to be passed beyond the wheel hub, and then turned back to its normal position which is perpendicular to the axis of rotation of the wheel hub, so as to be placed either in front of or behind the wheel hub. This is illustrated in FIGS. 9C, 9D, 10C, 10D, 11B, 11D, 12B, and 12D.

The T-shape of the mounting clamps 40 and the provision of two clamp plate openings 44 and 45 that register with connector openings 30 of the mounting rail assures that the connection made through the mounting rail 20 is very strong and capable of resisting forces equal to the limitations of the force resistance of the other components of the wheel rim assembly.

Also, the triangular arrangement of the clamp plate openings 40, 45 and the clamp stem opening 46 assures the strongest relationship between the clamp rail and the wheel hub. Although the mounting clamps 40 are illustrated as being T-shaped, other shapes, such as more triangular shapes, can be utilized if desired.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. An adjustable rim assembly of a wheel of an industrial vehicle for changing the spacing of the wheel from the vehicle, comprising:

a rim base having a cylindrical inwardly facing surface defining a central axis;

a mounting rail concentric with said axis and rigidly connected to and extending radially inwardly from said cylindrical inwardly facing surface of said rim base;

said mounting rail formed of a series of axially inner and axially outer planar mounting panels each extending normal to said axis and alternately axially off-set from one another about said rim base with intermediate axially extending support panels joined to said mounting panels, all of said axially inner mounting panels positioned in a first common plane and all of said axially outer mounting panels positioned in a second common plane, said axially inner and axially outer mounting panels each defining opposed axially inner and axially outer mounting faces and connector openings therein;

mounting clamps positioned in a common plane against said mounting faces of at least some of said alternate ones of said mounting panels, said mounting clamps each defining at least one clamp plate opening therethrough adapted to align with one of said connector openings of said mounting rail and a clamp stem opening adapted to align with connectors of a wheel hub, whereby said mounting clamps are mountable at their mounting plate openings to either of said axially inner or axially outer surfaces of either of said axially inner or axially outer mounting panels to provide multiple positions of the mounting clamps along the axis of the rim base.

2. The adjustable rim assembly of claim 1, wherein:

said axially inner and axially outer mounting panels each define two connector openings therein, and said mounting clamps each define two clamp plates opening therein adapted to align with the connector openings of said mounting panels.

3. An adjustable rim assembly of a wheel of an industrial vehicle for changing the spacing of the wheel from the vehicle, comprising:

a rim base having a cylindrical inwardly facing surface defining a central axis;

a mounting rail concentric with said axis and rigidly connected to and extending radially inwardly from said inwardly facing surface of said rim base;

said mounting rail formed of a series of axially inner and axially outer mounting panels each extending normal to said axis and alternately axially offset from one another about said rim base, all of said axially inner mounting panels positioned in a first common plane and all of said axially outer mounting panels positioned in a second common plane;

mounting clamps supported by and extending radially inwardly of said mounting, panels and defining connector openings therein for mounting to a wheel hub;

whereby said mounting clamps are mountable to either the axially inner or axially outer surfaces of the hub of a wheel to provide multiple positions of the rim assembly along the axis of the rim base.

4. The adjustable rim assembly of claim 3, wherein:

said axially inner and axially outer mounting panels each define two connector openings therein, and said mounting clamps each define two openings therein adapted to align with the connector openings of said mounting panels, and said mounting clamps each defining an opening adapted to align with the openings of a wheel hub.

5. In a wheel rim assembly for mounting a tire of an industrial vehicle to a drive hub of a vehicle, including a cylindrical rim base having an axis of rotation, the improvement therein of:

a mounting rail for concentric connection to the rim base of a wheel, said mounting rail comprising a continuous circular band of material for placement within the rim base of a wheel rim;

said band having a series of axially inner and axially outer mounting panels each extending normal to the axis of rotation and alternately axially offset from one another with said axially inner mounting panels positioned in a first common plane and said axially outer panels positioned in a second common plane; and said axially inner and axially outer mounting panels having connector openings formed therein for connecting said mounting panels to a wheel hub.

6. The wheel rim assembly of claim 5, wherein:

said axially inner and axially outer mounting panels of said mounting rail each have a pair of connector openings formed therethrough, and further comprising:

a clamp for mounting the wheel rim to a hub of a wheel and to said axially inner or axially outer mounting panels of said mounting rail;

each said clamp including a pair of connector openings sized, shaped and spaced for alignment with said connector openings of said mounting panels and a third opening displaced from said pair of openings of said clamp and spaced axially inwardly of said pair of connector openings for clamping to the hub of a wheel, said connector openings arranged in a triangular relationship with each other.

7. The wheel rim assembly of claim 5, wherein said axially inner mounting panels of said mounting rail are rigidly connected to said cylindrical rim base.

8. The wheel rim assembly of claim 5, wherein said axially outer mounting panels of said mounting rail are rigidly connected to said cylindrical rim base.

9. The wheel rim assembly of claim 5, wherein said mounting rail further includes axially extending connector panels connected to said mounting panels.

10. The wheel rim assembly of claim 5, wherein said fore mounting panels are of greater diameter than the diameter of said aft mounting panels.

* * * * *